US012783447B2

(12) United States Patent
Huang et al.

(10) Patent No.: US 12,783,447 B2
(45) Date of Patent: Nov. 3, 2026

(54) UNIVERSAL SERIAL BUS DEVICE AND SYSTEM TYPE DETERMINING METHOD THEREOF

(71) Applicant: REALTEK SEMICONDUCTOR CORPORATION, Hsinchu (TW)

(72) Inventors: Po-Chao Huang, Hsinchu County (TW); Li-Wei Huang, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 115 days.

(21) Appl. No.: 18/453,920

(22) Filed: Aug. 22, 2023

(65) Prior Publication Data

US 2024/0070109 A1 Feb. 29, 2024

(30) Foreign Application Priority Data

Aug. 24, 2022 (TW) ................................. 111131920

(51) Int. Cl.
*G06F 13/42* (2006.01)

(52) U.S. Cl.
CPC .. *G06F 13/4282* (2013.01); *G06F 2213/0042* (2013.01)

(58) Field of Classification Search
CPC ..................... G06F 13/4282; G06F 2213/0042
See application file for complete search history.

(56) References Cited

U.S. PATENT DOCUMENTS

2004/0199702 A1* 10/2004 Baba ..................... G06F 13/102 710/305
2008/0066088 A1* 3/2008 Lu ........................... G06F 3/038 719/327
2010/0309491 A1* 12/2010 Yasui .................... G06F 3/1204 358/1.6
2012/0054372 A1* 3/2012 Chen ..................... G06F 9/4411 710/13
2013/0028301 A1* 1/2013 Sashittal ........... H04W 72/0446 375/219
2015/0242357 A1* 8/2015 Pancholi ............. G06F 11/3051 710/13

(Continued)

FOREIGN PATENT DOCUMENTS

CN 108696631 A 10/2018
TW M465604 U 11/2013
TW 201807589 A 3/2018

OTHER PUBLICATIONS

Office Action of Taiwan corresponding application 111131920.

(Continued)

*Primary Examiner* — Henry Tsai
*Assistant Examiner* — Harry Z Wang
(74) *Attorney, Agent, or Firm* — WPAT, P.C.; Anthony King

(57) ABSTRACT

The present disclosure provides an USB device and a system type determining method thereof. The system type determining method includes: determining, by the USB device, whether an USB host transmit at least one of an HID interrupt signal and an UAC1 status interrupt signal; and determining, by the USB device, a system type of the USB host according to the result of determining whether the USB host transmit at least one of the HID interrupt signal and the UAC1 status interrupt signal.

6 Claims, 11 Drawing Sheets

(56) References Cited

U.S. PATENT DOCUMENTS

| | | | | |
|---|---|---|---|---|
| 2016/0224493 | A1 * | 8/2016 | Wang | G06F 13/24 |
| 2017/0046122 | A1 * | 2/2017 | Tanaka | G06F 3/165 |
| 2018/0173661 | A1 * | 6/2018 | Rand | H04R 3/12 |
| 2018/0288208 | A1 | 10/2018 | Lee et al. | |
| 2020/0104053 | A1 * | 4/2020 | Peng | G06F 3/162 |

OTHER PUBLICATIONS

English abstract of Office Action of Taiwan corresponding application 111131920.
English abstract of TW 201807589A.
English abstract of TW M465604U.
US20180288208A1 corresponds to CN108696631.

* cited by examiner

UNIVERSAL SERIAL BUS DEVICE AND SYSTEM TYPE DETERMINING METHOD THEREOF

CROSS REFERENCE TO RELATED APPLICATIONS

This application claims priority of Taiwan application No. 111131920 filed on Aug. 24, 2022, which is incorporated by reference in its entirety.

BACKGROUND

Field of the Invention

The present invention relates generally to USB device and system type determining method thereof, in particular, to USB device and USB host system type of determining method thereof.

Description of Related Art

Currently, there are a variety of universal serial bus (USB) devices on the market, and each USB device has its own function. The known USB devices need to be designed for the specific type of system that needs to be connected to the USB master when they are developed, so there is very little flexibility in their use. In addition, some USB devices are equipped with a switch that allows users to manually switch between the types of systems for the USB masters they want to connect.

BRIEF SUMMARY OF THE INVENTION

Some embodiments of the present invention provide a method for determining a system type of a universal serial bus (USB) device. The method includes: determining, by the USB device, whether an USB host transmits at least one of a human interface device (HID) interrupt signal and an USB audio device class 1 (UAC1) status interrupt signal; and determining, by the USB device, a system type of the USB host according to the result of whether the USB host transmits at least one of the HID interrupt signal and the UAC1 status interrupt signal Some embodiments of the present invention provide an USB device. The USB device includes: a transmission interface circuit and a processor circuit. The transmission interface circuit is configured to electrically connect to a USB host. The processor circuit is electrically connected to the transmission interface circuit and configured to: determine whether the USB host transmits at least one of an HID interrupt signal and an UAC1 status interrupt signal using the transmission interface circuit; and determine a system type of the USB host according to the result of whether the USB host transmits at least one of the HID interrupt signal and the UAC1 status interrupt signal.

BRIEF DESCRIPTION OF THE DRAWINGS

Aspects of the present invention are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Embodiments of the present invention are discussed in detail below. It should be appreciated, however, that the present invention provides many applicable inventive concepts that can be embodied in a wide variety of specific contexts. The specific embodiments discussed are merely illustrative and do not limit the scope of the disclosure.

Figure 1:
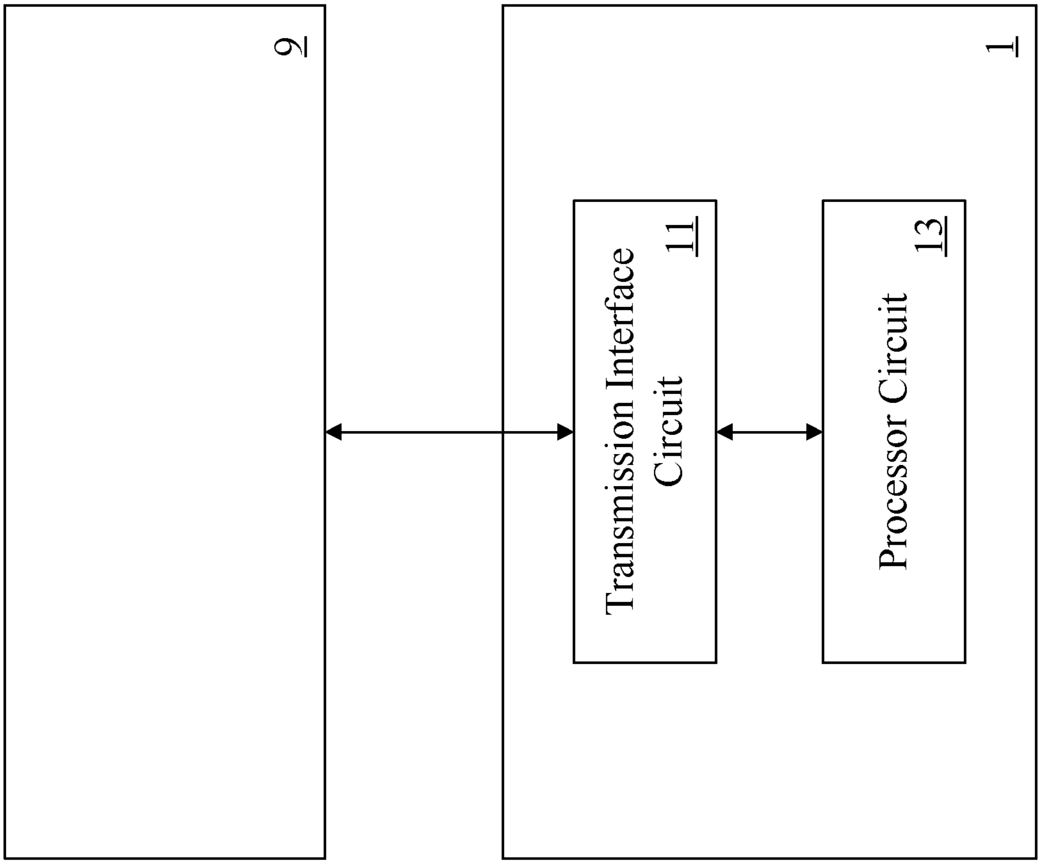
FIG. 1 is a block diagram of an USB device according to some embodiments of the present disclosure.

Reference is made to FIG. 1, which is a block diagram of a universal serial bus (USB) device 1 according to some embodiments of the present disclosure. In some embodiments, the USB device 1 includes: a transmission interface circuit 11 and a processor circuit 13. The transmission interface circuit 11 is electrically connected to a USB host 9 for transmitting signals to or receiving signals from the USB host 9. The processor circuit 13 is electrically connected to the transmission interface circuit 11, and the processor circuit 13 processes the signals received by the transmission interface circuit 11 or transmits the processed signals through the transfer interface 11. The operation is further described below.

Specifically, the processor circuit 13 of the USB device 1 determines the whether the USB host 9 transmits at least one of a human interface device (HID) interrupt signal and a USB audio class 1 (UAC1) status interrupt signal via the transmission interface circuit 11. Then, the processor circuit 13 of the USB device 1 determines a system type of the USB host 9 according to the result of whether the USB host transmits at least one of the HID interrupt signal (e.g., the HID interrupt IN signal) and UAC1 status interrupt signal (e.g., the UAC1 class-specific request signal).

In some embodiments, the HID interrupt signal is transmitted in a byte format. When the processor circuit 13 of the USB device 1 determines that the USB host 9 does not transmit the HID interrupt signal, the processor circuit 13 of the USB device 1 determines that the system type of the USB host 9 is a gaming platform operating system (e.g., the gaming platform operating system of Sony PlayStation4, Sony PlayStation5 or Nintendo Switch) according to the result that the USB host 9 does not transmit any HID interrupt signal.

Figure 2A:
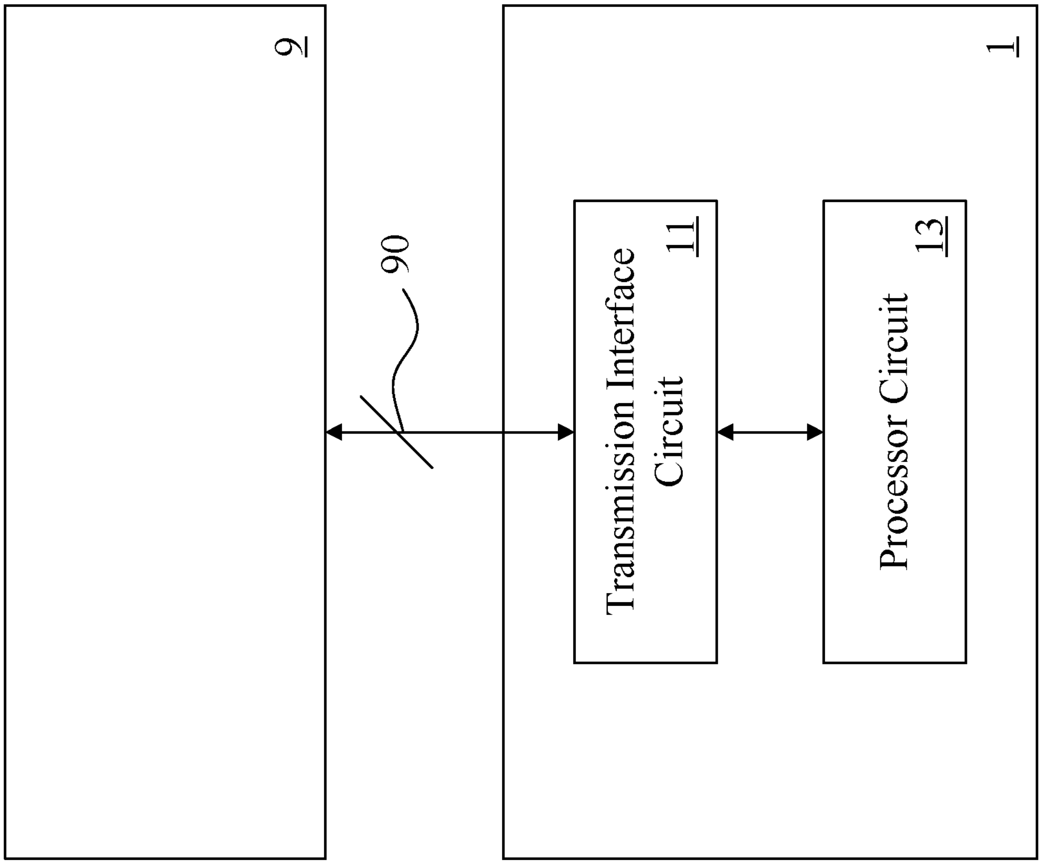
FIG. 2A is a schematic diagram illustrating the signal transmissions according to some embodiments of the present disclosure.

Reference is made to FIG. 2A, which is a schematic diagram illustrating the signal transmission according to some embodiments of the present disclosure. In some embodiments, the HID interrupt signal is transmitted in a byte format. When the processor circuit 13 of the USB device 1 determines that the USB host 9 transmits a HID interrupt signal 90 and the USB host 9 does not transmit any UAC1 status interrupt signal, the processor circuit 13 of the USB device 1 determines that the system type of the USB host 9 is a Windows operating system (i.e., the Windows operating system of Microsoft) according to the result that the USB host 9 transmits the HID interrupt signal 90 and the USB host 9 does not transmit any UAC1 status interrupt signal.

Figure 2B:
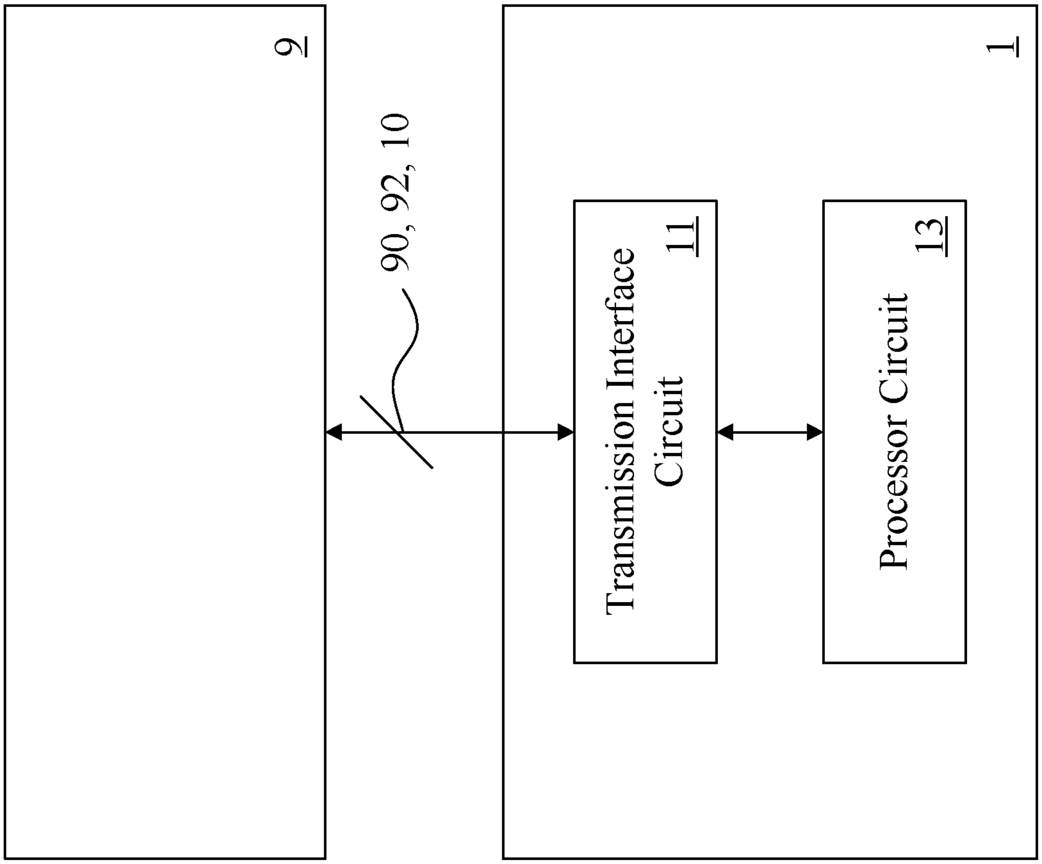
FIG. 2B is a schematic diagram illustrating the signal transmissions according to some embodiments of the present disclosure.
Figure 2C:
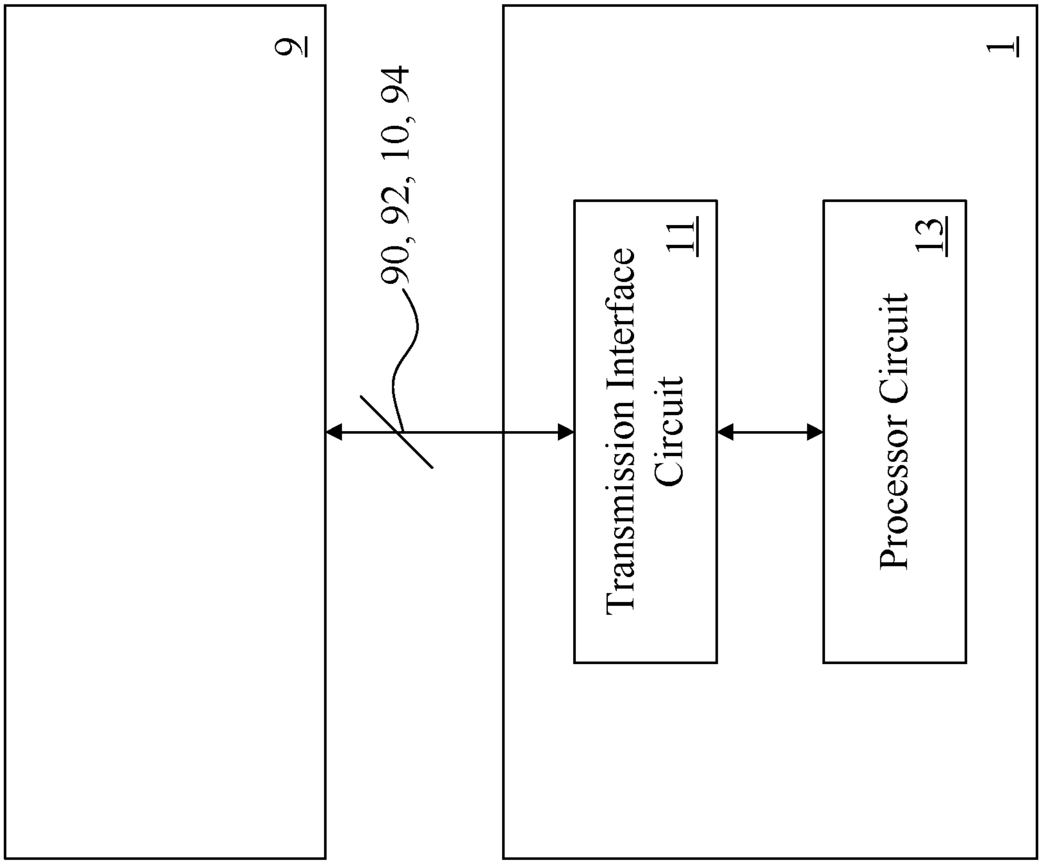
FIG. 2C is a schematic diagram illustrating the signal transmissions according to some embodiments of the present disclosure.

Reference is made to FIG. 2B and FIG. 2C, which are schematic diagrams illustrating the signal transmission according to some embodiments of the present disclosure. In some embodiments, the HID interrupt signal is transmitted in a byte format. When the processor circuit 13 of the USB device 1 determines that the USB host 9 transmits the HID interrupt signal 90 and the USB host 9 transmits a UAC1 status interrupt signal 92, the processor circuit 13 of the USB device 1 transmits a status type signal 10 to the USB host 9 via the transmission interface circuit 11 according to the result that the USB host 9 transmits the HID interrupt signal 90 and the USB host 9 transmits the UAC1 status interrupt signal 92.

Next, the processor circuit 13 of the USB device 1 determines whether the USB host 9 returns a get status command according to the status type signal 10, and determine the system type of the USB host 9 according to the result of whether the USB host 9 returns get status command. As shown in FIG. 2B, when the processor circuit 13 of the USB device 1 determines that the USB host 9 does not transmit any get status command according to the status type signal, the processor circuit 13 of the USB device 1 determines that the system type of the USB host 9 is a Linux operating system (e.g., the general Linux operating system, Android mobile phone operating system, Chromebook operating system); as shown in FIG. 2C, when the processor circuit 13 of the USB device 1 determines that the USB host 9 returns a get status command 94 according to the status type signal 10, the processor circuit 13 of the USB device 1 determines that the system type of the USB host 9 is a Macintosh operating system.

Figure 2D:
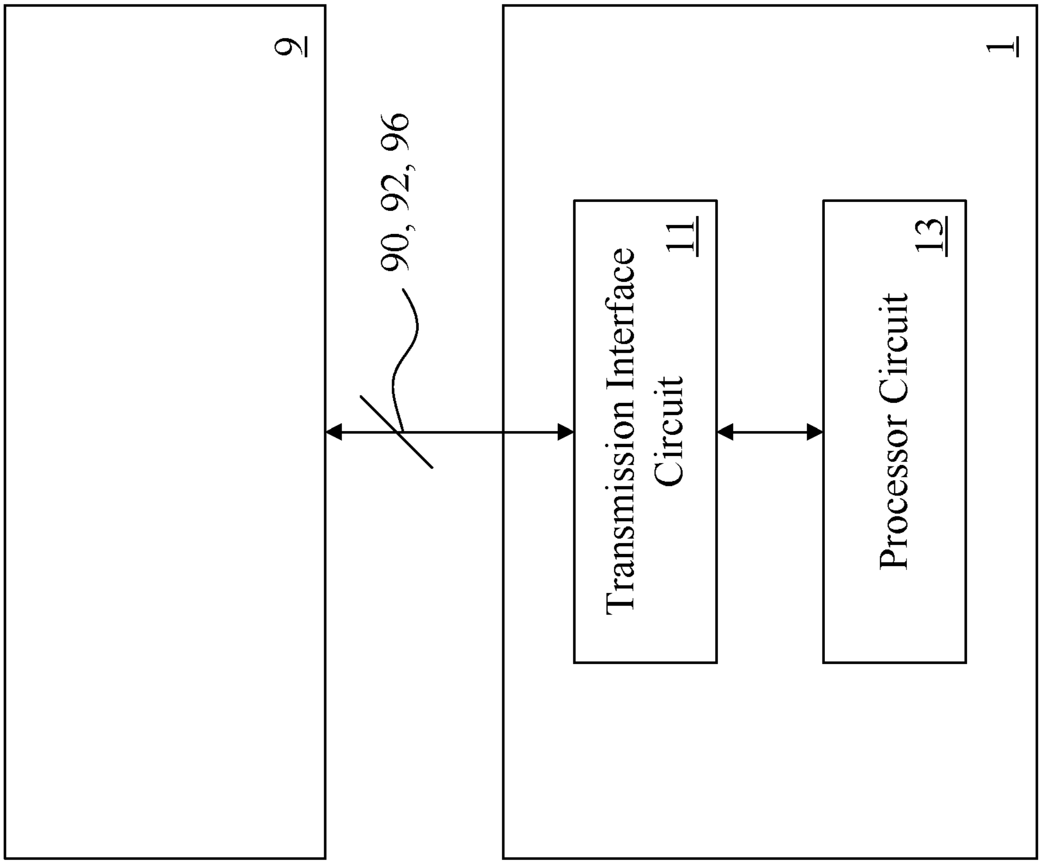
FIG. 2D is a schematic diagram illustrating the signal transmissions according to some embodiments of the present disclosure.
Figure 2E:
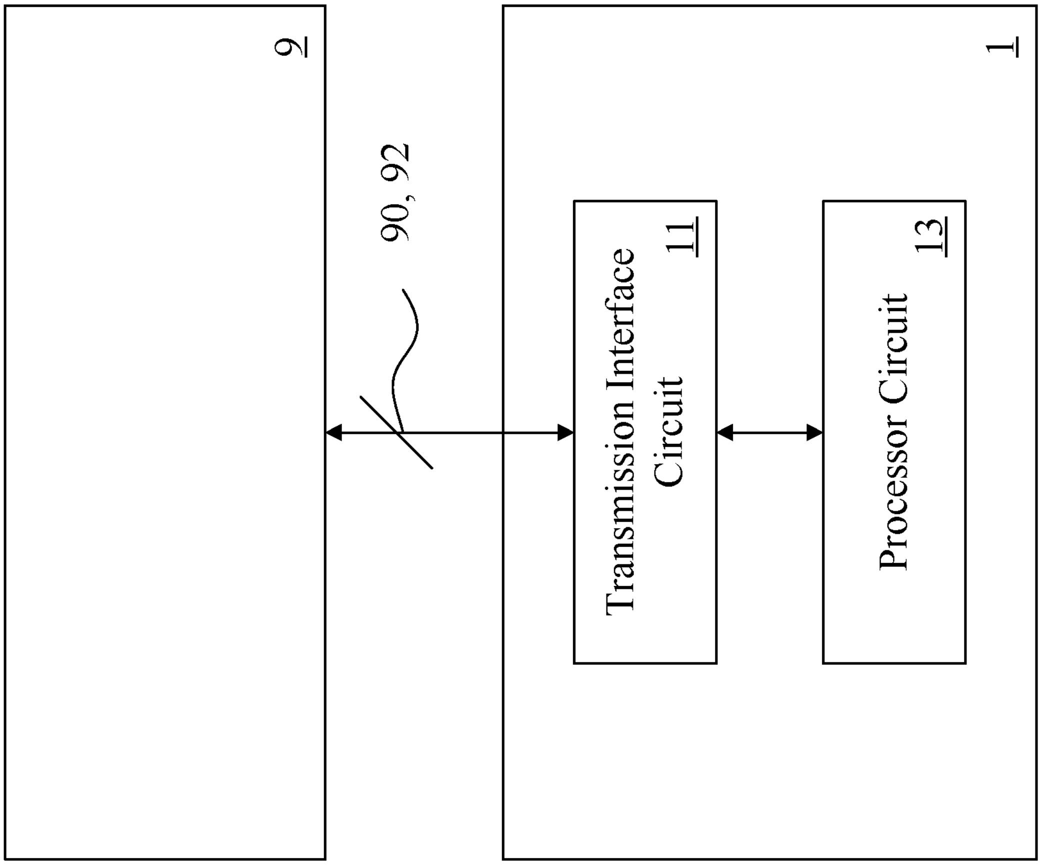
FIG. 2E is a schematic diagram illustrating the signal transmissions according to some embodiments of the present disclosure.

Reference is made to FIG. 2D and FIG. 2E, which are schematic diagrams illustrating the signal transmission according to some embodiments of the present disclosure. In some embodiments, the HID interrupt signal is transmitted in a byte format. When the processor circuit 13 of the USB device 1 determines that the USB host 9 transmits the HID interrupt signal 90 and the USB host 9 transmits the UAC1 status interrupt signal 92, the processor circuit 13 of the USB device 1 determines whether the USB host 9 transmits a set resolution command (e.g., UAC1 Set Res command). As shown in FIG. 2D, when the processor circuit 13 of the USB device 1 determines that the USB host 9 transmits a set resolution command 96, the processor circuit 13 of the USB device 1 determines that the system type of the USB host 9 is Linux operating system; as shown in FIG. 2E, when the processor circuit 13 of the USB device 1 determines that the USB host 9 does not transmit any set resolution command, the processor circuit 13 of the USB device 1 determines that the system type of the USB host 9 is a Macintosh operating system.

Figure 2F:
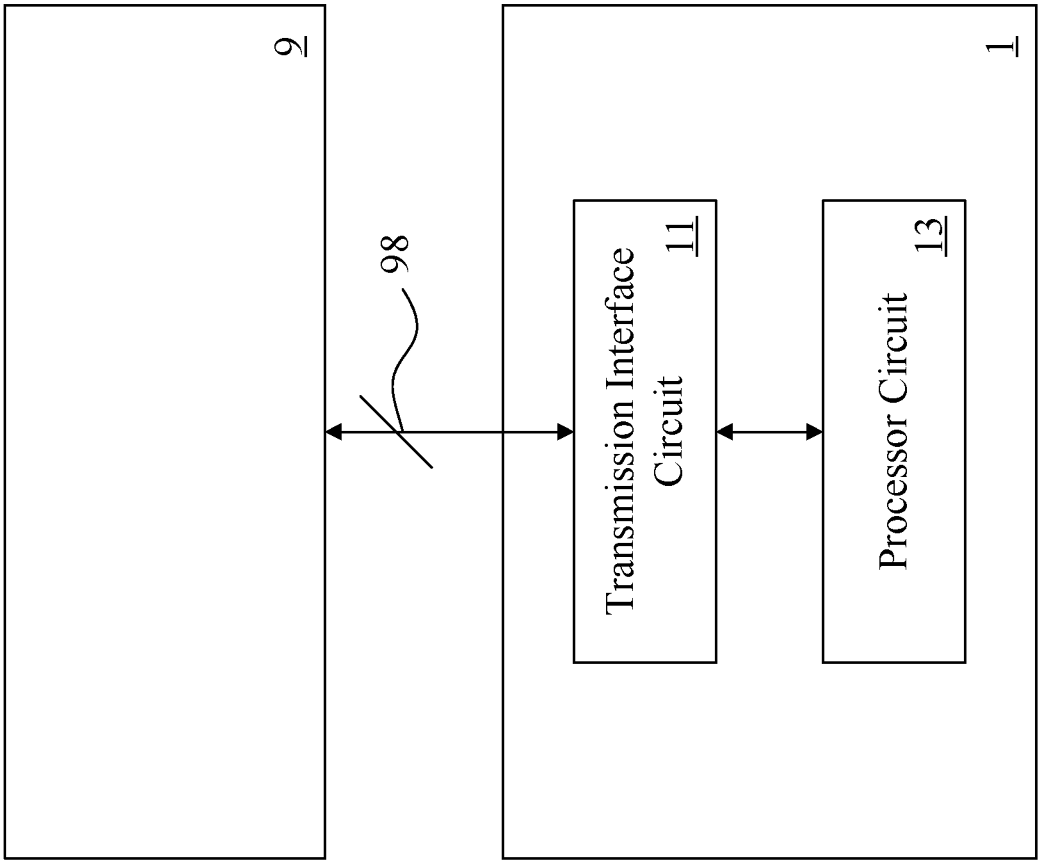
FIG. 2F is a schematic diagram illustrating the signal transmissions according to some embodiments of the present disclosure.

Reference is made to FIG. 2F, which is a schematic diagram illustrating the signal transmission according to some embodiments of the present disclosure. In some embodiments, the HID interrupt signal is transmitted in a bit format. When the processor circuit 13 of the USB device 1 determines that the USB host 9 transmits an HID interrupt signal 98, the processor circuit 13 of the USB device 1 determines that the system type of the USB host 9 is a Class 1 gaming platform operating system (e.g., the gaming platform operating system of Nintendo Switch) according to the result that the USB host 9 transmits the HID interrupt signal 98; when the processor circuit 13 of the USB device 1 determines that the USB host 9 does not transmit any HID interrupt signal, the processor circuit 13 of the USB device 1 determines that the system type of the USB host 9 is a Class 2 gaming platform operating system (e.g., Sony Play Station4 or Sony PlayStation5) according to the result that the USB host 9 does not transmit any HID interrupt signal.

It should be noted that whether the foregoing HID interrupt signal format is a byte format or a bit format can be determined when the USB boot enumeration program is started on both sides after the USB device 1 is electrically connected to the USB host 9.

Figure 3:
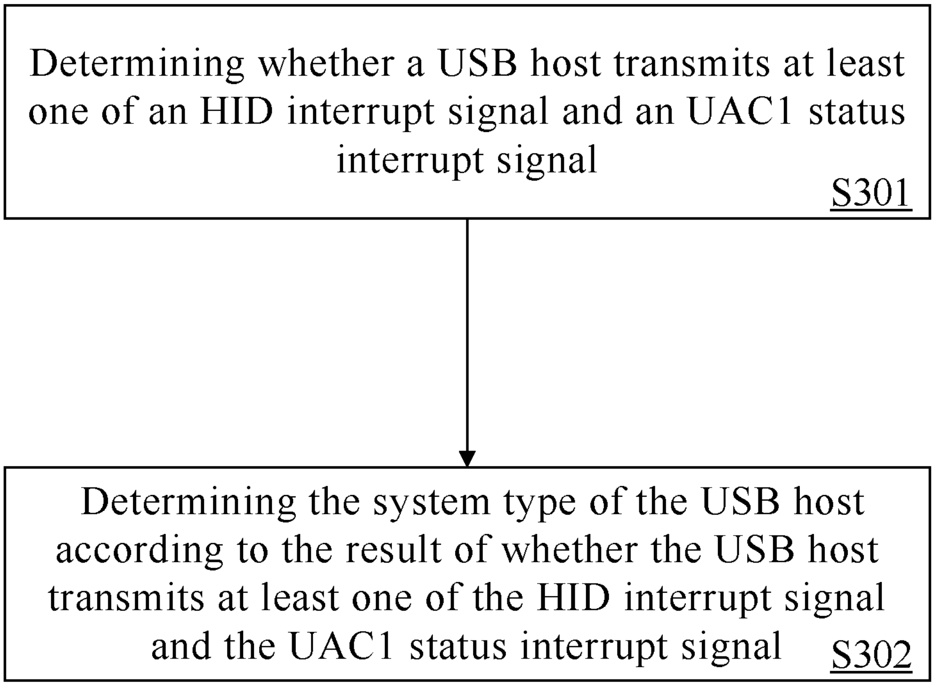
FIG. 3 is a flowchart of a method for determining the system type of a USB device according to some embodiments of the present disclosure.

Some embodiments of the present disclosure include a method for determining the system type of a USB device, and the flowchart thereof is shown in FIG. 3. The method for determining the system type of these embodiments is implemented by a USB device (such as the USB device discussed in foregoing embodiments), and the detailed operation of the method is discussed below. First, step S301 is execute to determine whether a USB host transmits at least one of an HID interrupt signal and a UAC1 status interrupt signal. Then, step S302 is execute to determine the system type of the USB host according to the result of whether the USB host transmits at least one of the HID interrupt signal and the UAC1 status interrupt signal.

Figure 4:
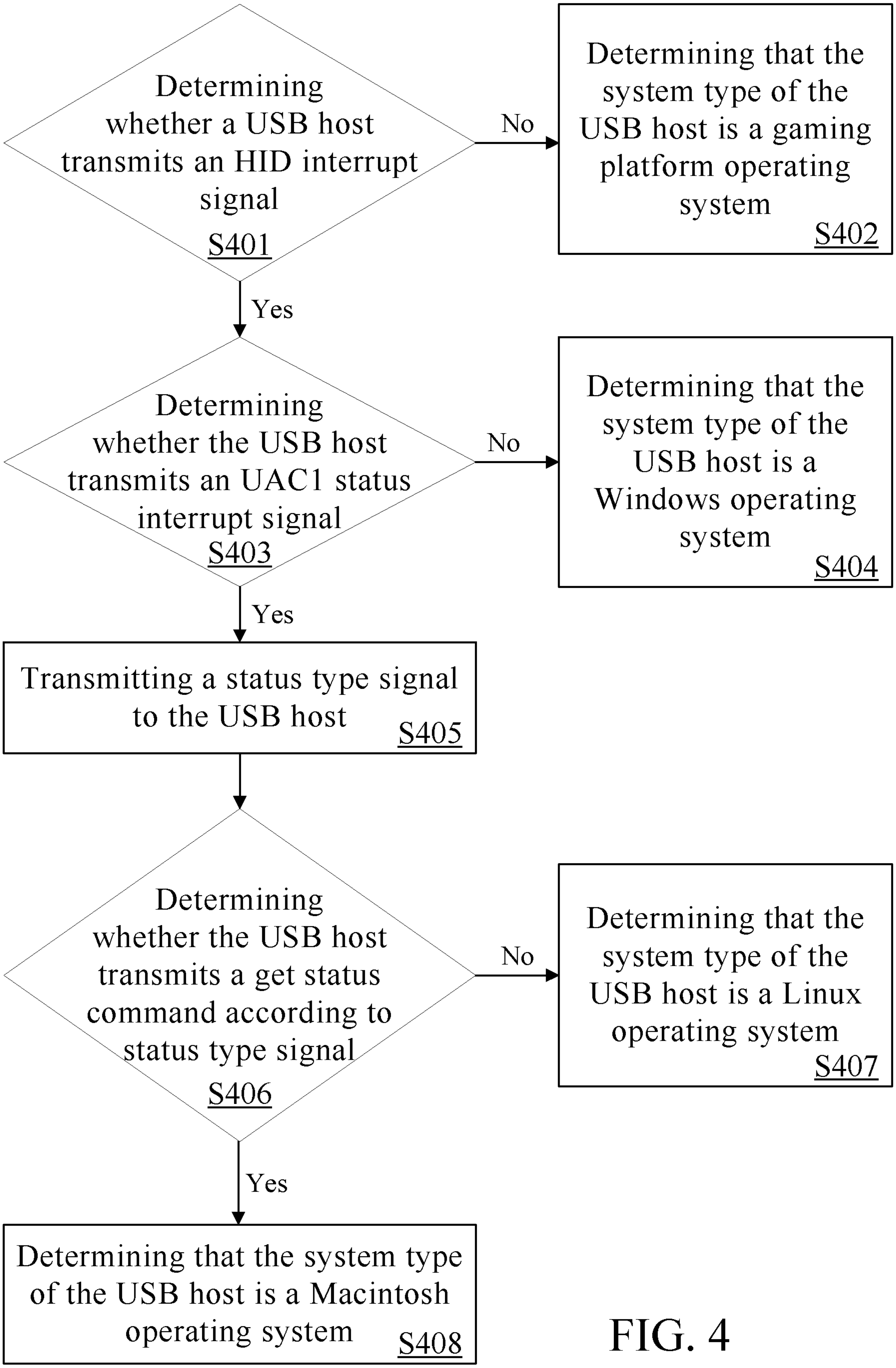
FIG. 4 is a flowchart of a method for determining the system type of a USB device according to some embodiments of the present disclosure.

Some embodiments of the present disclosure include a method for determining the system type of a USB device, and the flowchart thereof is shown in FIG. 4. The method for determining the system type of these embodiments is implemented by a USB device (such as the USB device discussed in foregoing embodiments), the USB device and the HID interrupt signal of the USB host are in the format of byte, and the detailed operation of the method is discussed below. First, step S401 is execute to determine whether a USB host transmits an HID interrupt signal. If not, then, the method proceeds to execute step S402 to determine that the system type of the USB host is a gaming platform operating system.

If the result in Step S401 is yes, then the method proceeds to execute step S403 to determine whether the USB host transmits a UAC1 status interrupt signal. If not, then the method proceeds to execute step S404 to determine that the system type of the USB host is a Windows operating system. If yes, then the method proceeds to execute step S405 to transmit a status type signal to the USB host.

Then step S406 is execute to determine whether the USB host transmits a get status command according to status type signal. If not, then the method proceeds to execute step S407 to determine that the system type of the USB host is a Linux operating system. If yes, then the method proceeds to execute step S408 to determine that the system type of the USB host is a Macintosh operating system.

Figure 5:
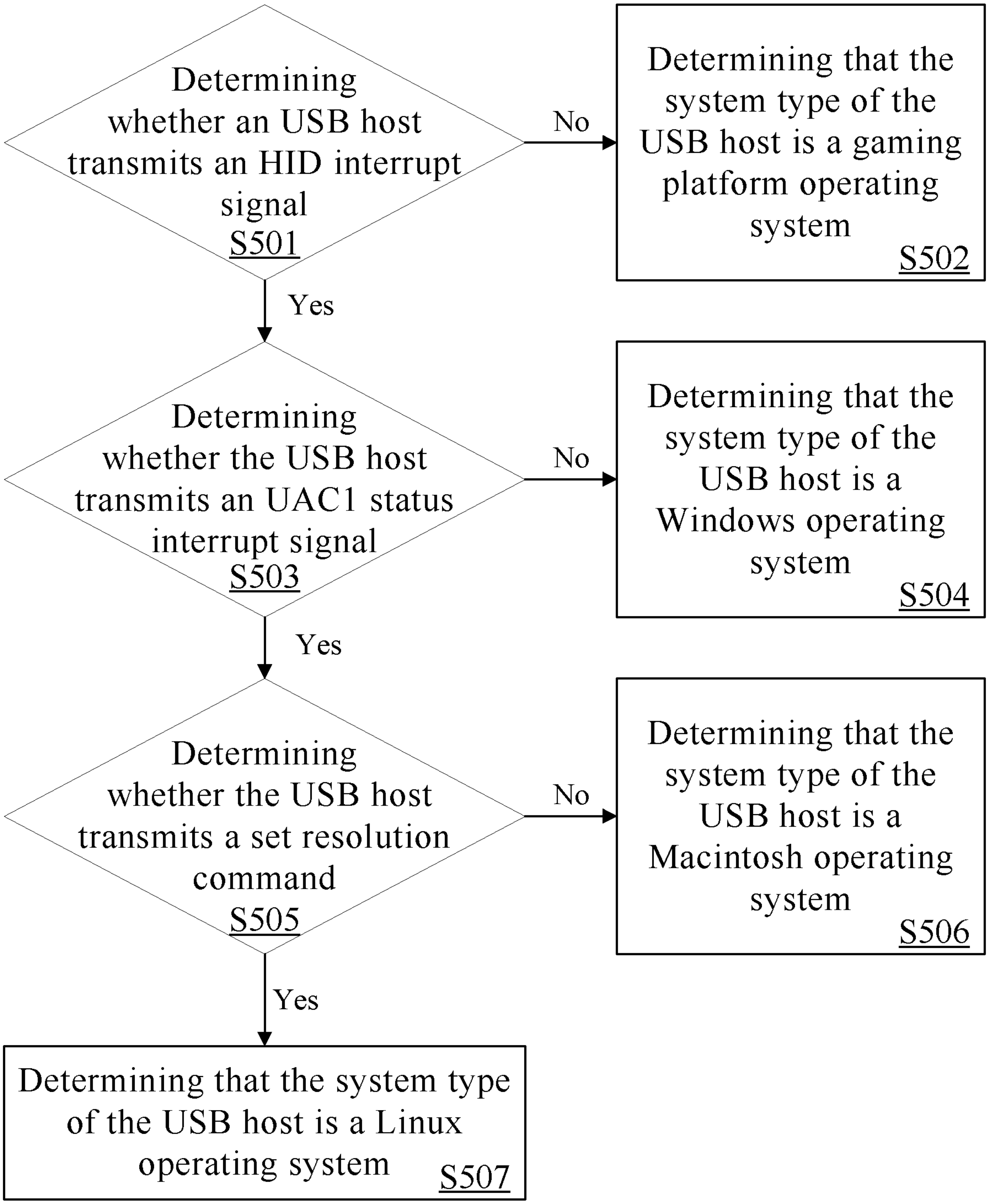
FIG. 5 is a flowchart of a method for determining the system type of a USB device according to some embodiments of the present disclosure.

Some embodiments of the present disclosure include a method for determining the system type of a USB device, and the flowchart thereof is shown in FIG. 5. The method for determining the system type of these embodiments is implemented by a USB device (such as the USB device discussed in foregoing embodiments), the USB device and the HID interrupt signal of the USB host are in the format of byte, and the detailed operation of the method is discussed below. First, step S501 is execute to determine whether a USB host transmits an HID interrupt signal. If not, then, the method proceeds to execute step S502 to determine that the system type of the USB host is a gaming platform operating system.

If the result in Step S501 is yes, then the method proceeds to execute step S503 to determine whether the USB host transmits a UAC1 status interrupt signal. If not, then the method proceeds to execute step S504 to determine that the system type of the USB host is a Windows operating system. If yes, then the method proceeds to execute step S505 to determine whether the USB host transmits a set resolution command.

If the result in Step S505 is no, then the method proceeds to execute step S506 to determine that the system type of the USB host is a Macintosh operating system. If the result in Step S505 is yes, then the method proceeds to execute step S507 to determine that the system type of the USB host is a Linux operating system.

Figure 6:
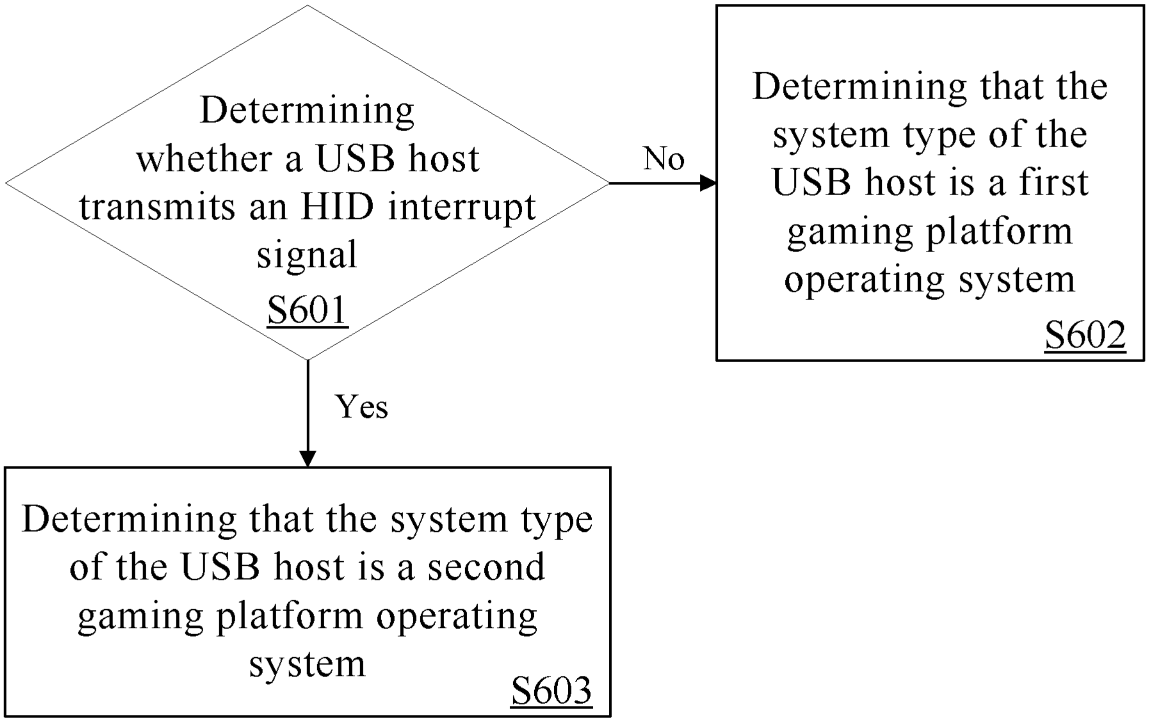
FIG. 6 is a flowchart of a method for determining the system type of a USB device according to some embodiments of the present disclosure.

Some embodiments of the present disclosure include a method for determining the system type of a USB device, and the flowchart thereof is shown in FIG. 6. The method for determining the system type of these embodiments is implemented by a USB device (such as the USB device discussed in foregoing embodiments), the USB device and the HID interrupt signal of the USB host are in the format of bit, and the detailed operation of the method is discussed below. First, step S601 is execute to determine whether a USB host transmits an HID interrupt signal. If not, then, the method proceeds to execute step S602 to determine that the system type of the USB host is a first gaming platform operating system. If yes, then the method proceeds to execute step S603 to determine that the system type of the USB host is a second gaming platform operating system.

In view of the foregoing, the USB device and method for determining the system type provided by the present disclosure can automatically determine the system type of the USB host according to various signals of the USB host after the USB host is connected, thereby enhancing the convenience of use and effectively reducing the hardware cost.

While this invention has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the invention by simply employing the elements of the independent claims. Accordingly, embodiments of the invention as set forth herein are intended to be illustrative, not limiting. Various changes may be made without departing from the spirit and scope of the invention.

What is claimed is:

1. A universal serial bus (USB) device, comprising:

a transmission interface circuit configured to electrically couple to a USB host; and a processor circuit electrically coupled to the transmission interface circuit and configured to:

determine whether the USB host transmits a human interface device (HID) interrupt signal and a USB audio Class 1 (UAC1) class-specific request signal using the transmission interface circuit, and generate a result; and determine that an operating system of the USB host comprises a gaming platform operating system, a Windows operating system, a Linux operating system, or a Macintosh operating system according to the result, wherein when the processor circuit determines that the USB host transmits the HID interrupt signal and the USB host does not transmit the UAC1 class-specific request signal, the processor circuit determines that the operating system of the USB host is the Windows operating system according to the result that the USB host transmits the HID interrupt signal and the USB host does not transmit the UAC1 class-specific request signal.

2. A universal serial bus (USB) device, comprising:

a transmission interface circuit configured to electrically couple to a USB host; and a processor circuit electrically coupled to the transmission interface circuit and configured to:

determine whether the USB host transmits a human interface device (HID) interrupt signal and a USB audio Class 1 (UAC1) class-specific request signal using the transmission interface circuit, wherein when the processor circuit determines that the USB host transmits the HID interrupt signal and the USB host transmits the UAC1 class-specific request signal, the processor circuit is further configured to:

transmit a status type signal to the USB host using the transmission interface circuit; and determine whether the USB host transmits a get status command according to the status type signal using the transmission interface circuit; and determine that an operating system of the USB host comprises a gaming platform operating system, a Windows operating system, a Linux operating system, or a Macintosh operating system, wherein the processor circuit determines the operating system of the USB host according to a result of whether the USB host transmits the get status command.

3. The USB device of claim 2, wherein when the processor circuit determines the USB host does not transmit the get status command according to the status type signal, the processor circuit determines that the operating system of the USB host is the Linux operating system.

4. The USB device of claim 2, wherein when the processor circuit determines the USB host transmits the get status command according to the status type signal, the processor circuit determines that the operating system of the USB host is the Macintosh operating system.

5. The USB device of claim 1, wherein the HID interrupt signal is in a bit format.

6. A universal serial bus (USB) device, comprising:

a transmission interface circuit configured to electrically couple to a USB host; and a processor circuit electrically coupled to the transmission interface circuit and configured to:

determine whether the USB host transmits a human interface device (HID) interrupt signal and a USB audio Class 1 (UAC1) status interrupt signal using the transmission interface circuit, and generate a result; and determine a system type of the USB host according to the result, wherein the processor circuit is further configured to:

determine that the USB host does not transmit the HID interrupt signal; and determine that the system type of the USB host is a gaming platform operating system according to the result that the USB host does not transmit the HID interrupt signal.

* * * * *